United States Patent [19]
Strehlke et al.

[11] 3,887,609
[45] June 3, 1975

[54] PROCESS FOR THE PRODUCTION OF HIGHER ALKYLACRYLATES AND METHACRYLATES

[75] Inventors: Günter Strehlke, Rheinkamp; Wilhelm Franz, Rheinhausen; Günter Osterburg, Homberg, all of Germany

[73] Assignee: Deutsche Texaco Aktiengesellschaft, Hamburg, Germany

[22] Filed: Apr. 1, 1974

[21] Appl. No.: 456,584

[30] Foreign Application Priority Data
Apr. 6, 1973 Germany............................ 2317226

[52] U.S. Cl............................................ 260/486 R
[51] Int. Cl............................................ C07c 69/54
[58] Field of Search ................................. 260/486 R

[56] References Cited
UNITED STATES PATENTS

| | | | |
|---|---|---|---|
| 2,822,348 | 2/1958 | Haslam | 260/486 R |
| 3,056,817 | 10/1962 | Weber et al. | 260/486 R |
| 3,056,818 | 10/1962 | Weber et al. | 260/486 R |
| 3,639,461 | 2/1972 | Ito et al. | 260/486 R |

Primary Examiner—Lorraine A. Weinberger
Assistant Examiner—Paul J. Killos
Attorney, Agent, or Firm—T. H. Whaley; C. G. Ries; Robert A. Kulason

[57] ABSTRACT

A process for the production of higher alkyl acrylates and methacrylates having reduced color numbers and containing minimum quantities of polymerization inhibitors and other impurities, wherein the alkyl chains contain 3 or more carbons, by the transesterification of methyl acrylate or methacrylate with alkanols of 3 or more carbons in the presence of a titanium alcoholate as transesterification catalyst and also in the presence of polymerization inhibitor combination and entraining agent for removing the methyl alcohol by-product. The transesterification is carried out by passing an oxygen-containing gas through the reaction mixture. In recovering the higher alkylacrylates or methacrylates the resultant reaction mixture is subjected to a steam distillation.

7 Claims, No Drawings

PROCESS FOR THE PRODUCTION OF HIGHER ALKYLACRYLATES AND METHACRYLATES

BACKGROUND OF INVENTION

The invention relates to a process for the production of higher alkyl acrylates and alkyl methacrylates having particularly low color numbers and containing particularly small quantities of polymerization inhibitors and other impurities, in which the alkyl chains contain more than 2 carbon atoms, by the transesterification or alcoholysis of methyl acrylate or methyl methacrylate with the corresponding alcohols in the presence of a titanium alcoholate as transesterification catalyst and also in the presence of a polymerization inhibitor combination and entraining agent for removing the methyl alcohol produced.

It is known that strongly discolored esters are formed when saturated organic acids are subject to esterification with a saturated alcohol in the presence of an esterification catalyst, such as an acid, an alkaline solution or an alcoholate. In view of this fact it is proposed in French Pat. No. 1,163,297 to decolorize the esters by adding substantial amounts of an adsorption agent, such as activated carbon, aluminum oxide, silicate, bleaching earth, or the like. In the French specification example, the ester is treated with about 6 percent activated carbon whereby the Hazen number drops from 500 to 50.

The problem of discoloration of the esters becomes, however, considerably more difficult where esters are to be produced from unsaturated organic acids and saturated alcohols, for example, the industrially extremely important alkyl acrylates and alkyl methacrylates, which cannot be decolorized as simply as saturated esters by treatment with substantial quantities of an adsorption agent, since the unsaturated acids have a much greater tendency to discoloration than have the saturated acids. Moreover, considerable quantities of polymerization inhibitors have to be added to unsaturated acids, such inhibitors generally containing phenolic groups which cause substantial discoloration as, for example hydroquinone, or which themselves constitute dyes, such as methylene blue, of which a determined portion remains in the unsaturated esters, so that the subsequent polymerization thereof is delayed or hindered to a more or less substantial extent.

In British patent specification No. 962,928 it is proposed to improve the process for the production of higher alkyl acrylates or alkyl methacrylates by starting from the methyl and ethyl esters of acrylic or methacrylic acid instead of starting directly from acrylic or methacrylic acid. The higher alkyl acrylates or alkyl methacrylates are produced by transesterification of the methyl or ethyl esters with the corresponding higher alcohols in the presence of a titanium or zirconium alcoholate as transesterification catalyst and in the presence of hydroquinone or methylene blue as polymerization inhibitor and of benzene or cyclohexane as an entraining agent for the removal from the reaction mixture of the methyl or ethyl alcohol set free in the reaction. This process, which is undoubtedly an improvement in the art insofar as the discoloration and purity of the alkyl acrylates and alkyl methacrylate are concerned, is nevertheless not wholly satisfactory. The discoloration and polymerization delay caused by the residual inhibitors in the esters still are so substantial that the unsaturated esters cannot be used in all fields of application. Moreover, upon vacuum fractionation of the reaction product, undesirable by-products still pass into the main fraction.

It is an object of the invention to provide a process by which higher alkyl acrylates and alkyl methacrylates may be produced, in which the alkyl chains contain more than 2 carbon atoms, and which exhibit particularly little discoloration and contain particularly small amounts of polymerization inhibitors and other impurities. In addition, it is an object to provide such a process which is relatively simple and thus tends to save costs.

DESCRIPTION OF THE INVENTION

The invention is related to a transesterification process for the production of a higher ester member from the group consisting of alkyl acrylate or alkyl methacrylate, said alkyl is of 3–24 carbons, wherein a lower ester selected from the group consisting of methyl acrylate or methyl methacrylate is contacted with an alkanol of from 3 to 24 carbons in the presence of a titanium alcoholate as catalyst, a polymerization inhibitor and an entraining agent for the methyl alcohol by-product.

Surprisingly we have discovered that higher ester members which have particularly low color numbers and contain very small quantities of polymerization inhibitors and other impurities may be obtained, according to the invention by the following improvements:

a. contacting said lower ester with said alkanol in the presence of said titanium alcoholate represented by the formula Ti(OR)$_4$ where R is an alkyl of from 2 to 24 carbons
and a polymerization inhibitor combination of 2,6-di-tert.-butyl-paracresol and adsorptive carbon b. carrying out said esterification at a temperature between 100° and 150°C. by passing through an oxygen containing gas, and c. recovering said higher ester member.

In said contacting step the initial mole ratio of said lower ester to said alkanol is between about 2 : 1 and 1,1 : 1, the titanium alcoholate content of between about 0,1 – 1,0 wt. percent based on 100 percent yield, the 2,6-diterl.-butyl-para-cresol content of between 60 and 200 ppm and the adsorptive carbon content of between about 0,1 – 0,2 wt. percent based on 100 % yield. ( . . . wt. percent based on 100 percent yield stands for wt. percent by weight of theoretical ester obtainable).

In a preferred embodiment of the invention the recovery of the higher alkyl acrylates or alkyl methacrylates comprises removing remaining lower ester and entrainer from the resultant reaction mixture by steam distillation and filtering the residue to recover the higher alkyl ester member as filtrate.

The polymerization inhibitor added to the reaction mixture is a combination of 2,6-di-tert.-para-cresol (TBC) and adsorptive carbon, such as carbon black or activated carbon. The entraining agents employed can be any of the standard entraining agents for methyl alcohol such as cyclohexane, cyclopentane, hexane, benzene, methylcyclohexane, methylcyclopentane and dimethylcyclopentane. The entraining agent normally constitutes between about 10 and 30 wt. percent of the initial transesterification mixture.

The transesterification is carried out by passing an oxygen-containing gas, for example, air, at an elevated temperature through the reaction mixture while removing methyl alcohol by-product with entraining agent as overhead. Surplus entraining agent and methyl acrylated or methyl methacrylate are, upon termination of the transesterification process, removed from the reaction mixture by steam distillation (steam stripping) with hydrolysis of the titanium alcoholate catalyst, so that the titanium hydroxide formed may, upon termination of the steam distillation, be filtered off together with the carbon. Alternatively, water may be added initially to the crude reaction product with subsequent hydrolysis at elevated temperature (e.g., 70° to 90 °C.) of the titanium alcoholate, the titanium hydroxide formed being subsequently filtered off together with the carbon catalyst with resultant filtrate subjected to steam distillation.

The transesterification reaction is carried out at a temperature between about 100 and 150°C., preferably in the range of 110° to 130°C. utilizing a reactant mole ratio of methyl acrylate or methyl methacrylate to higher alkanol of between about 2 : 1 and 1.1:1 , preferably 1.2 : 1 .

The azeotropic mixture of methyl alcohol and entraining agent, preferably cyclohexane, distilling off and is preferably introduced through a suitable column into water so that the methyl alcohol dissolves in the water and the cyclohexane or other entraining agent separates as the upper layer, which is preferably returned to the reaction mixture through the top of the column and may be practically quantitatively recycled apart from small losses. Desirably, the azeotropic mixture of entraining agent and methyl alcohol obtained is introduced into the water until the methyl alcohol is present in the water in a concentration of about 70 percent. The aqueous methyl alcohol is then replaced by fresh water and it may be worked up by distillation.

The use of a combination of 2,6,-di-tert.-butyl-paracresol (TBC) and adsorptive carbon, preferably activated carbon, as polymerization inhibitor is of vital importance to the color and low concentration of polymerization inhibitors in the higher alkyl acrylates and alkyl methacrylates obtained. The inhibitor quantity of between about 60 and 200 ppm TBC preferably between 80 and 100 ppm, with a ppm ratio of TBC to carbon of between about 1 :50 , preferably 1:10 basis 100% yield, produces an unforeseeable synergistic effect, as shown by the following tests:

1. 60 ppm TBC were admixed with methyl methacrylate and the mixture was then heated to reflux. Polymerization of the methyl methacrylate commenced after a period of 2 hours.

2. 60 ppm TBC and 0.1 wt. percent (1,000 ppm) of activated carbon were added to methyl methacrylate and the mixture was heated to reflux. After a period of as long as 10 hours there was still not the slightest sign of polymerization of the methyl methacrylate.

This discovery of synergism now makes it possible to use considerably smaller quantities of polymerization inhibitors. Moreover, the adsorptive carbon has decolorizing properties so that an already very pale crude product is obtained.

The transesterification reaction is carried out by passing through the reaction mixture, preferably recirculating, and oxygen-containing gas, for example air, at an elevated temperature in order to prevent any polymerization of the methyl acrylate and/or methyl methacrylate in the reactor column. Under advantageous conditions, the oxygen-containing gas introduction is at a rate of between about 0.1 and 1 volume percent of oxygen per hour per free volume of reactor.

In respect to recovery of the transesterified product of a desired degree of purity, contrary to the generally held assumption that in the steam distillation of esters a certain degree of saponification of the esters was always to be expected and that pure esters cannot thus be obtained, it has been found that the excess entraining agent and methyl acrylate or methyl methacrylate may be advantageously separated through a suitable column with the aid of steam distillation (steam stripping) without saponification of the esters. The titanium alcoholates (ethyl, propyl, or butyl titanate is preferably used) are hydrolyzed and the titanium hydroxide formed may be filtered off together with the carbon, it being certain that additional coloring substances are adsorbed by the precipitating titanium hydroxide and thus eliminated. However, alternatively, from 2 to about 5 wt. percent of water may be added initially to the crude transesterification product and the titanium alcoholates may be hydrolyzed for about 30 to 60 minutes at a temperature of about 70°– 95°C., the precipitating titanium hydroxide and the carbon being filtered off together and the crude product being only then subjected to steam distillation whereby the surplus entraining agent, the methyl acrylate or methyl methacrylate and the alcohol set free by hydrolysis of the titanium alcoholate are driven off through a suitable column. The higher alkyl acrylates or alkyl methacrylates obtained are virtually colorless and free from polymerization inhibitors and other impurities and may thus be used in any field of application. The distillate flowing off through the column provided with a condenser is passed into a receiver in which it seapartes into two layers. The lower layer of water may be used for the extraction of the azeotropic mixture of entraining agent and methyl alcohol obtained by transesterification reaction, the upper layer of methyl acrylate or methyl methacrylate and cyclohexane (or other entraining agent) being recycled to the transesterification reaction through the top of the transesterification column.

In the steam distillation or steam stripping it is unnecessary to introduce oxygen-containing gases to hinder polymerization of the methyl acrylate or methyl methacrylate, since the bulk of the TBC probably also distills over with it, polymerization being thus prevented.

It is to be noted the desired degree of purity could not be obtained if the crude product were then to be subjected to a vacuum distillation or producing the higher alkyl acrylates or alkyl methacrylates as proposed in the aforementioned British patent specification No. 962,928.

The process according to the invention may be carried out batchwise or in continuous manner as the given operating conditions permit or require.

Examples of the reactant alkanols contemplated herein are butanol, pentanol, hexanol, heptanol, octyl alcohol, nonyl alcohol, decyl alcohol, lauryl alcohol, stearyl alcohol, cetyl alcohol, and eicosanol.

Examples of the corresponding alkyl acrylates and methacrylate products contemplated herein are butyl acrylate, pentyl acrylate, hexyl acrylate, heptyl acrylate, octyl acrylate, lauryl acrylate, stearyl acrylate, cetyl acrylate, eicosyl acrylate, butyl methacrylate, pentyl methacrylate, hexyl methacrylate, heptyl methacrylate, octyl methacrylate, lauryl methacrylate, stearyl methacrylate, cetyl methacrylate, and eicosyl methacrylate.

Examples of the alkyl titanates in addition to those specifically mentioned are n-butyl titanate, isopropyl titanate, stearyl titanate, lauryl titanate, and ethyl titanate. The titanate catalyst is employed in an amount of between about 0.1 and 1 wt. percent, preferably between 0.2 and 0.5 wt. percent, basis 100 percent yield.

EXAMPLE 1

For the production of lauryl methacrylate, a round-bottomed flask having a capacity of 4,000 cm³ and provided with a 10-tray column was charged with 744 grams of natural lauryl alcohol of the following composition:

| | | |
|---|---|---|
| $C_{10}$ | — | 2% |
| $C_{12}$ | — | 68% |
| $C_{14}$ | — | 22% |
| $C_{16}$ | — | 7% |
| $C_{18}$ | — | 1% |

The alcohol was heated with stirring to a temperature of 80°C. At this temperature, 2.24 grams of n-butyl titanate, dissolved in 100 grams cyclohexane, was added as the transesterification catalyst. The 1.5 grams activated carbon, corresponding to about 0.15 wt. percent (1500 ppm) based on a 100 wt. percent yield, was added and the mixture was heated to a temperature of 125°C. When this temperature was reached, the passing through of air and the addition of 441 grams methyl methacrylate (20 wt. percent excess), inhibited with 0.2 grams TBC corresponding to 200 ppm. based on a 100 percent yield, were started. The addition of methyl methacrylate was controlled so that the temperature in the reaction mixture did not fall below 125°C.

The azeotropic mixture of methyl alcohol and cyclohexane formed during the transesterification and having a boiling point of about 55°C., rose to the top of the column whence it was withdrawn, after adjustment of a recycle ratio of about 1 : 1, and introduced into the bottom of a separator containing a layer of water 50 cm. deep, so that the methyl alcohol dissolved in the water and the cyclohexane separated on the surface of the water. The cyclohexane may be returned to the reaction mixture through the top of the column as required. The methyl alcohol obtained was introduced into the water until a concentration exceeding 70 wt. percent was reached. The 70 wt. percent methanol was then replaced by fresh water and could be worked up into anhydrous methyl alcohol.

The elimination of the bulk of methanol was complete after about 3 hours and the temperature at the top of the column rose slowly from 55°C. to the boiling point of the azeotropic mixture of cyclohexane and methyl methacrylate, namely 79.5°C. The course of the reaction was then followed (controlled) by determination of the hydroxyl number. The reaction was terminated when the hydroxyl number had reached a value of 1. Then 20 grams of water were added to the reaction product and the mixture was maintained at a temperature of 80°- 90°C. for a period of 45 minutes. The titanium alcoholate hydrolyzed to form titanium hydroxide which coagulated with the activated carbon. The titanium hydroxide and the activated carbon were then filtered off and the residual reaction product was then subjected to steam distillation (steam stripping) at a temperature of 110°C. The mixture of cyclohexane, methyl methacrylate and water passing off through a 10-tray column was condensed and collected in a receiver. In the receiver, the lower layer of water can be used for separating the azeotropic mixture of cyclohexane and methanol, and the upper layer of methyl methacrylate and cyclohexane can be recycled to the reaction. The product obtained in the bottom was separated from the layer of water, 998 grams of a water-white lauryl ester of methacrylic acid corresponding to a yield of 99.8 percent, based on lauryl alcohol charged.

The exceptionally slight discoloration and exceptionally low quantity of impurities present in the esters are evident from the following values:

| | |
|---|---|
| Hazen color number | 15 |
| Methacrylic acid | 0.012% by weight |
| Water | 0.08 % by weight |

EXAMPLE 2

For the production of a stearyl ester of acrylic acid, a round-bottomed flask having a capacity of 4,000 cm³ provided with a 5-tray column was charged with 845 grams of natural stearyl alcohol of the following composition:

| | | |
|---|---|---|
| $C_{14}$ | — | 5% |
| $C_{16}$ | — | 27% |
| $C_{18}$ | — | 66% |
| $C_{20}$ | — | 2% |

The stearyl alcohol was heated with stirring to a temperature of 85°C. At that temperature, 2.24 grams n-butyl titanate, dissolved in 100 grams cyclohexane, forming the transesterification catalyst was added. Then 1.0 gram activated carbon corresponding to about 0.1 wt. percent (1,000 ppm) based on a 100 percent yield, was added and the mixture was heated to a temperature of 120°C. When this temperature was reached, the passing through of air and the addition of 328 grams methyl acrylate (20 wt. percent excess) inhibited by 0.1 gram TBC corresponding to 100 ppm. based on a 100 wt. percent yield, were started. The addition of methyl acrylate was so controlled that the temperature did not drop below 120°C.

The azeotropic mixture of methyl alcohol and cyclohexane formed in the transesterification and having a boiling point of approximately 55°C. rose to the top of the column whence it was withdrawn, after setting a recyle ratio of 1 : 1, and then introduced into the bottom of a separator containing a layer of water 60 cm. deep, whereupon the methyl alcohol, dissolved in water, and the cyclohexane separated on the surface of the water. The separated cyclohexane could be recycled to the reaction mixture as required, preferably through the top of the column. Methanol was introduced into the water until an about 70 wt. percent aqueous methyl alcohol had formed, that aqueous methyl alcohol being then withdrawn and replaced by water. The 70 wt. percent methanol could then be worked up to recover essentially pure methanol.

After approximately three hours, the bulk of the methanol had separated and the temperature at the top of the column rose slowly from 55°C. to the boiling point of the azeotropic mixture of cyclohexane and methyl acrylate, namely 62.5°C.

The course of the reaction was followed by determination of the hydroxyl number. The reaction was terminated when the hydroxyl number had attained a value of 1.

The reaction mixture was then subjected to steam distillation at a temperature of 115°C. in the reaction mixture, whereby the titanium alcoholate hydrolyzed to form titanium hydroxide and coagulated with the activated carbon with simultaneous adsorption of TBC. The surplus cyclohexane and methyl acrylated were stripped off by the steam through a 10-tray column. In the receiver, the distillate separated into two layers, namely a lower layer of water and an upper layer of a mixture of cyclohexane and methyl acrylate. The layer of water could be used for separating the azeotropic mixture of methanol and cyclohexane and the upper layer could be returned to the reaction. The titanium hydroxide and the activated carbon were filtered off from the stearyl acrylate which remained. The product stearyl acrylate was water-white and was obtained in an amount of 992 grams, a yield of 99.2 wt. percent.

The Hazen color of and impurities contained in the ester were as follows:

| | |
|---|---|
| Hazen color number | 15 |
| Acrylic acid | 0.01% by weight |
| Water | 0.1 % by weight |

EXAMPLE 3

A higher alkyl methacrylate was produced from methyl methacrylate and an alcohol (alkanol mixture) produced by the Ziegler method and having the following composition:

| | | |
|---|---|---|
| $C_{14}$ | — | 2% |
| $C_{16}$ | — | 52% |
| $C_{18}$ | — | 32% |
| $C_{20}$ | — | 14% |
| $C_{20}$ | — | 3% |

The ester was produced as described in Example 1 or 2 and had the following data:

| | |
|---|---|
| Hazen color number | 15 |
| Methacrylic acid | 0.02 % by weight |
| Water | 0.05 % by weight |

The yield amounted to 99.5 wt. percent.

In the production of acrylic and methacrylic esters with alcohols having less than 12 carbon atoms, the steam stripping desirably should be carried out in a stripping column provided with a rectifying section in order to prevent entrainment of the esters.

We claim;

1. In a transesterification process for the production of a higher ester member selected from the group consisting of alkyl acrylate or alkyl methacrylate of low color numbers and low impurity content wherein said alkyl is of 3 to 24 carbons, wherein a lower ester selected from the group consisting of methyl acrylate and methyl methacrylate is contacted with an alkanol of from 3 to 24 carbons in the presence of a titanium alcoholate as catalyst, a polymerization inhibitor and an entraining agent for the methyl alcohol by-product, the improvement which comprises:

a. contacting said lower ester with said alkanol in the presence of said titanium alcoholate represented by the formula Ti(OR)$_4$ where R is an alkyl of from 2 to 24 carbons and a polymerization inhibitor combination of 2,6-di-tert.-butyl-para-cresol and adsorptive carbon, b. carrying out said esterification at a temperature of between 100° and 150°C. while bubbling through an oxygen-containing gas, c. recovering said higher ester member, in said contacting step the initial mole ratio of said lower ester to said alkanol of between about 2 : 1 and 1.1 : 1, the titanium alcoholate content of between about 0.1 and 1.0 wt. percent based on 100 percent yield, the 2,6-di-tert.-butyl-para-cresol content of between 60 and 200 ppm, and the adsorptive carbon content of between about 0.1 and 0.2 wt. percent based on 100 percent yield.

2. A process in accordance with claim 1 wherein said R is butyl, said entrainer is cyclohexane, and said carbon is activated carbon, and said oxygen-containing gas is air.

3. A transesterification process in accordance with claim 1 wherein said recovery comprises removing remaining lower ester and entrainer from the resultant reaction mixture by steam distillation and filtering the residue to recover said higher ester member as filtrate.

4. A process in accordance with claim 4 wherein said contacting is carried out in a column with recirculation of oxygen-containing gas.

5. A process in accordance with claim 4 wherein in said contacting the mixture of withdrawn methyl alcohol and entraining agent forms an upper layer on the surface of said water and is recycled to said contacting.

6. A process in accordacne with claim 4 wherein said steam distillation is carried out at a temperature in the range of from about 110°to 120°C. of the reaction mixture through a column, the mixture of water, entraining agent and lower ester member is passed to a separator, the mixture of entraining agent and lower member separating on the surface of the water and being recycled to said contacting and said separated water being employed for separating the steam distilled mixture of methyl alcohol by-product and entraining agent.

7. A transesterification process in accordance with claim 1 wherein said recovery comprises added from about 2 to 5 wt. percent water to the final reaction mixture, heating the aqueous resultant mixture to a temperature in the range of 70° to 95°C., removing titanium hydroxide therefrom by filtration, steaming distilling the filtrate and recovering from said filtrate said higher ester member as residue.

* * * * *